United States Patent
Sturt et al.

[11] Patent Number: 5,941,602
[45] Date of Patent: Aug. 24, 1999

[54] FOLDING SEAT ASSEMBLY

[75] Inventors: Alan Sturt, West Bloomfield; Marcel Corneliu Ban, Troy, both of Mich.

[73] Assignee: Lear Corporation, Southfield, Mich.

[21] Appl. No.: 08/950,558

[22] Filed: Oct. 15, 1997

[51] Int. Cl.$^6$ .................................................. A47C 1/02
[52] U.S. Cl. ...................... 297/340; 297/378.1
[58] Field of Search ............................. 297/15, 378.12, 297/378.1, 248, 257, 322, 324, 340; 296/65.01, 65.09

[56] References Cited

U.S. PATENT DOCUMENTS

| | | |
|---|---|---|
| 2,620,020 | 12/1952 | Austin . |
| 3,151,906 | 10/1964 | Roberts . |
| 3,746,389 | 7/1973 | Fourrey . |
| 3,784,252 | 1/1974 | Peterson .......................... 297/378.12 X |
| 4,341,415 | 7/1982 | Braun et al. . |
| 4,957,321 | 9/1990 | Martin et al. .......................... 296/65.09 |
| 4,969,682 | 11/1990 | Gray ..................... 297/378.1 |
| 4,986,591 | 1/1991 | Martienssen et al. . |
| 5,116,097 | 5/1992 | Bulgari . |
| 5,397,167 | 3/1995 | Fourrey et al. ................... 297/378.1 X |
| 5,454,624 | 10/1995 | Anglade et al. ............... 297/378.12 X |
| 5,482,346 | 1/1996 | Lesourd . |
| 5,492,386 | 2/1996 | Callum . |
| 5,527,087 | 6/1996 | Takeda et al. . |
| 5,588,707 | 12/1996 | Bolsworth et al. ................ 297/378.12 |
| 5,611,589 | 3/1997 | Fujii et al. . |
| 5,636,884 | 6/1997 | Ladetto et al. . |
| 5,733,005 | 3/1998 | Aufrere et al. . |

*Primary Examiner*—Milton Nelson, Jr.
*Attorney, Agent, or Firm*—Brooks & Kushman P.C.

[57] ABSTRACT

An auxiliary seat assembly for a passenger vehicle has a seat back portion pivoted at a rearward margin of a lower seat portion. A frame for the lower seat portion is supported on a base by a parallelogram linkage riser. A seat back panel for the seat back portion is supported by a parallelogram linkage secured to a seat back frame. Pivotal motion of the seat back portion to a forward, folded position is accompanied by forward movement of the lower seat portion. The riser and the seat back portion frame linkage are lowered as the seat back portion is folded forward, thereby reducing the overall stacked height of the folded seat assembly.

9 Claims, 5 Drawing Sheets

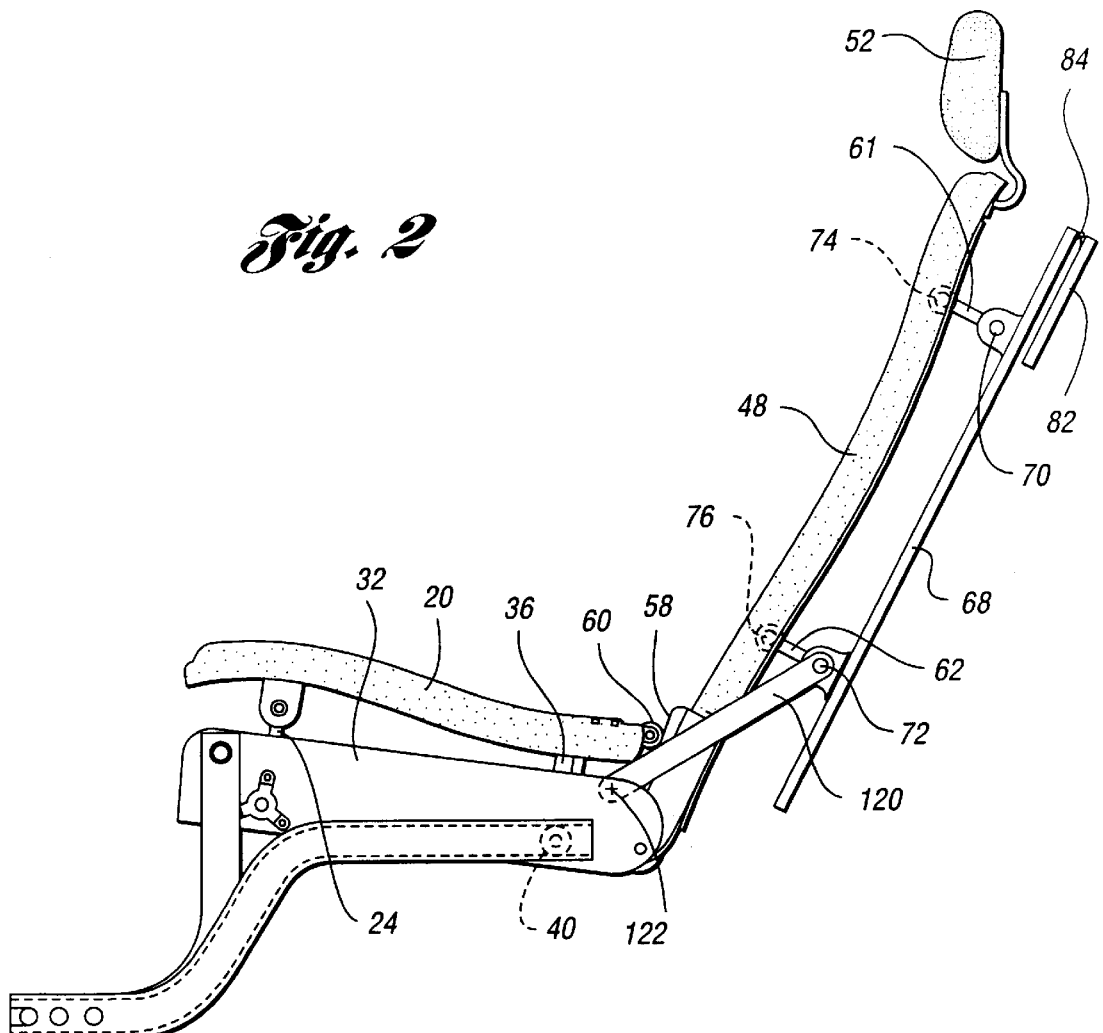
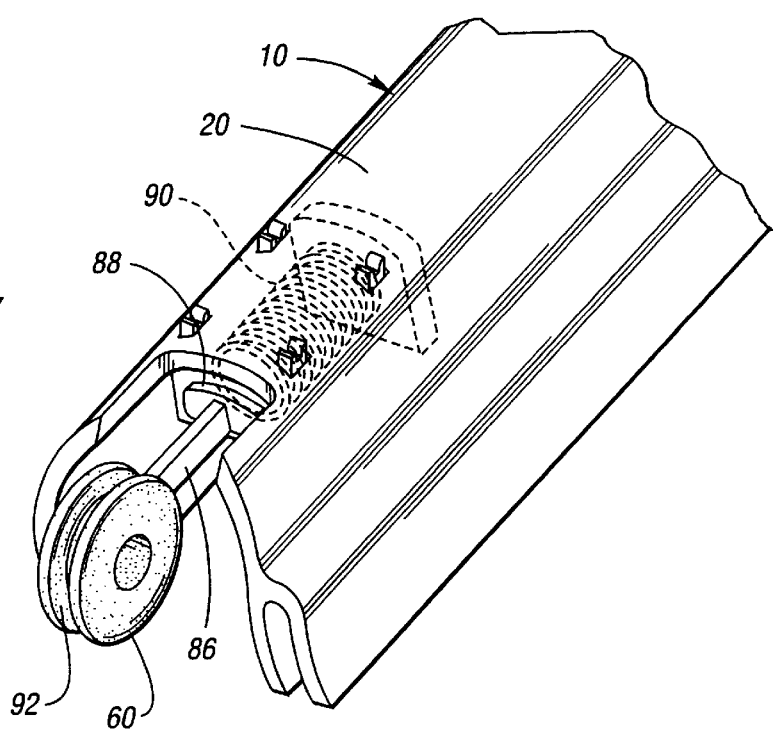

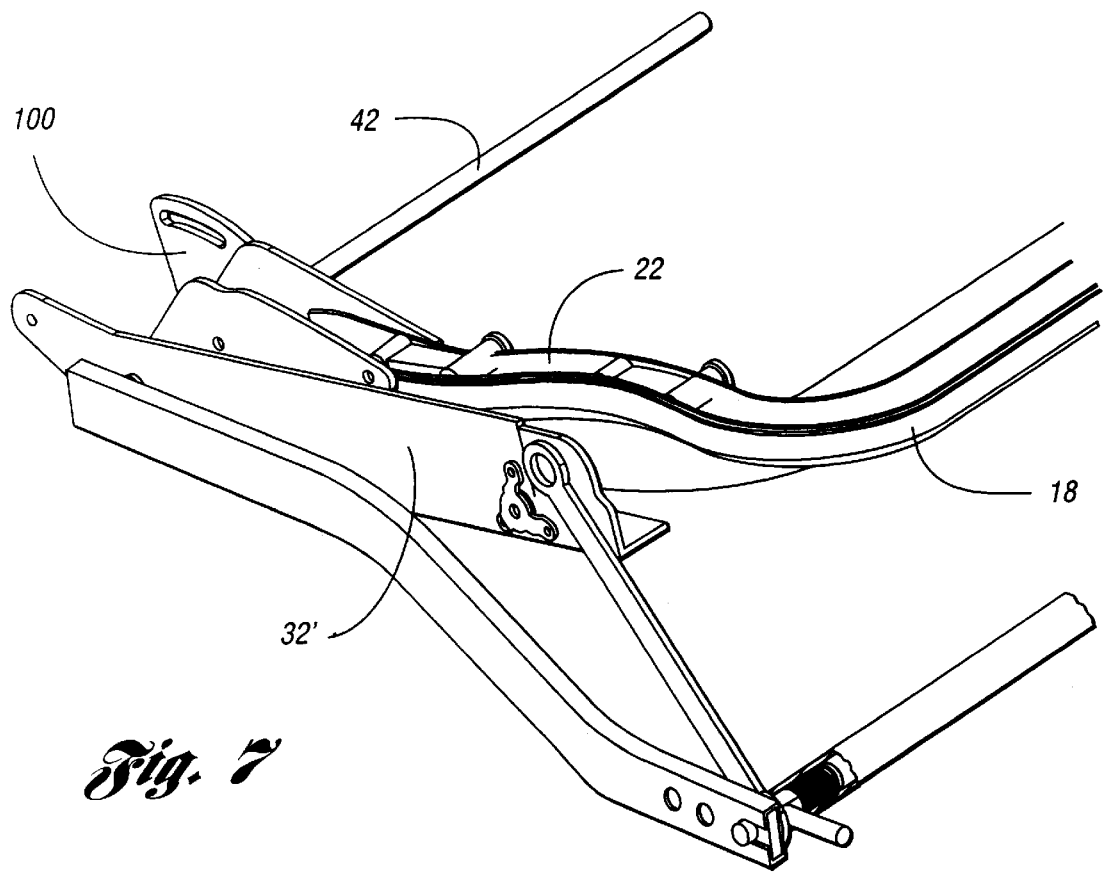
Fig. 7
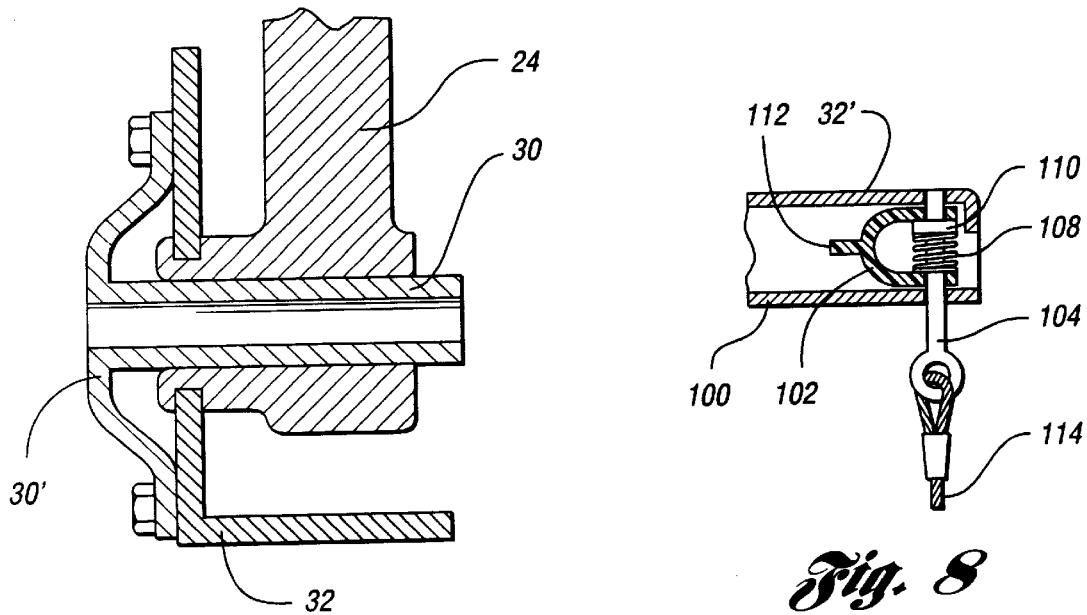
Fig. 7a
Fig. 8

FOLDING SEAT ASSEMBLY

TECHNICAL FIELD

The invention relates to auxiliary seat assemblies, particularly seat assemblies for rear passengers in an automotive vehicle.

BACKGROUND OF THE INVENTION

It is known design practice in the automotive body engineering art to make provision for a third row seat, or an auxiliary seat, rearward of the driver seat and the front passenger seat. In the case of a contemporary minivan, a sliding side door for the vehicle permits access of passengers to a row of rear seats. In such instances, it is desirable to fold the auxiliary seat forward to facilitate ingress and egress of the rear seat passengers. Contemporary minivans, as well as so-called sport utility vehicles, furthermore may be provided with auxiliary seats rearward of the driver seat and the front passenger seat. These would be positioned on a platform or structural floor panel that provides the secondary purpose of carrying cargo. In such instances the auxiliary seat must be folded forward to provide an extension of the cargo carrying floor area.

In each of these instances, it is necessary to fold the seat back portion of the seat assembly forward over the lower seat portion. The stacked height of the auxiliary seat assembly in its folded state then would be equal to the sum of the height of the seat riser assembly, the height of the lower seat portion and the thickness of the seat back portion. The overall stacked height thus is substantial in prior art designs. This is an inconvenience to passengers as they ingress and egress the vehicle through a side door opening. Furthermore, the stacked height of the auxiliary seat assembly reduces the cargo carrying capacity of the vehicle when the vehicle is adapted for carrying cargo.

BRIEF DESCRIPTION OF THE INVENTION

It is an objective of the invention to provide an auxiliary seat assembly that overcomes the shortcomings of prior art designs such as those described in the preceding background discussion. This is accomplished in the improved design of the invention by providing a lower seat portion that consists of a tubular lightweight frame and that is connected through a parallelogram linkage riser to a seat base. Further, the seat back portion of the seat assembly comprises a lightweight tubular frame that is secured by a parallelogram linkage to a back panel and that is pivoted at its lower margin to the seat base so that it can be tilted forward over the lower seat portion.

The upright seat back portion is engageable with the lower seat portion. Upon pivotal movement of the upright seat back portion to a stacked position over the lower seat portion, the lower seat portion is moved forward relative to the base.

The lower seat portion is supported by a foldable linkage mechanism that has linkage elements pivoted at one end on the base and on the lower seat portion at the other end. The lower seat portion thereby is lowered toward the base to reduce the overall stacked height of the seat assembly when it is in a folded state.

The riser assembly for the lower seat portion, when the seat back portion is folded forward, is shifted on its parallelogram linkage to a folded state. As the seat back portion is folded forward in this fashion, the parallelogram linkage for the seat back portion allows the lightweight frame for the seat back portion to move toward the back panel. The frame of the seat back portion engages the frame of the lower seat portion, thereby moving the latter as tilting motion of the seat back portion takes place.

The center of rotation of two of the links of the parallelogram linkage for the lower seat portion is on the pivotal axis of the seat back portion. The angular motion of the seat back portion relative to the angular motion of the links of the parallelogram linkage for the lower seat portion is controlled by a restrictor plate which allows for differences in the lengths of the arc through which the linkage elements of the lower seat portion and the length of the arc of travel of the point of contact of the seat back portion with the lower seat portion as the seat back portion is tilted forwardly.

The upright seat back portion engages the lower seat portion upon pivotal movement of the upright seat back portion toward a folded, stacked position over the lower seat portion, thus moving the lower seat portion forwardly.

The linkage for the lower seat portion allows the lower seat portion to be lowered as the upright seat back portion is folded. The upright seat back portion has a panel connected to a seat back frame by a foldable linkage, which allows the panel to move toward the seat back frame as the seat assembly assumes its folded state.

The height of the stacked assembly, when the seat assembly is in its folded state, is substantially less than the corresponding stacked height of known auxiliary seat assemblies or third row seat assemblies for contemporary vehicles.

BRIEF DESCRIPTION OF THE DRAWINGS

FIG. 2 is a side view of the seat assembly of FIG. 1;

FIG. 4 is a perspective view of a roller assembly at the point of contact of the frame for the seat back portion with the frame of t:he lower seat portion;

FIG. 7 is a perspective sub-assembly view of the foldable seat assembly of the invention;

FIG. 7a is a detailed sub-assembly view of a foldable link seen in FIG. 1; and

FIG. 8 is a detail view of a manually operable pin lock for the seat back portion of the seat assembly.

PARTICULAR DESCRIPTION OF THE INVENTION

Figure 1:
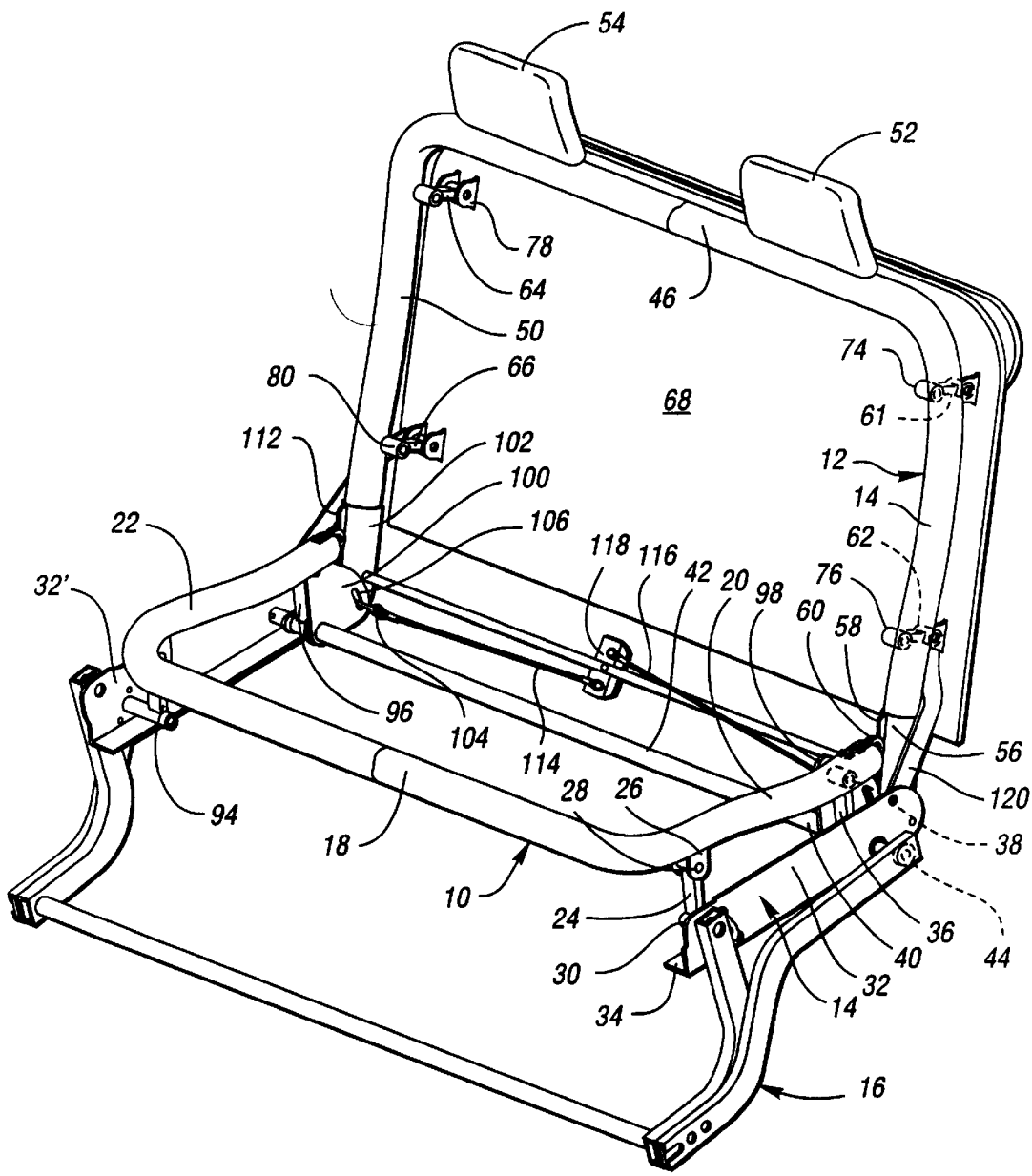
FIG. 1 is a perspective view of an auxiliary seat assembly embodying the features of the invention.

FIG. 1 shows an auxiliary seat assembly embodying the features of the invention. Reference numeral 10 generally designates the lower seat portion and reference numeral 12 generally designates the upright seat back portion. A stationary base or mounting frame is generally designated by reference numeral 14.

The base 14 can be secured to the floor plan structure of the vehicle. In the embodiment shown in FIG. 1, it is secured by means of a roller and track assembly 16. For purposes of the description of the invention, however, the base 14 functions as any stationary base that may be secured to the floor plan structure of a vehicle.

The track assembly 16 does not form a part of the present invention. Reference may be made to copending patent application Ser. No. 08/950,948, filed Oct. 15, 1997, entitled "Double Pivoting Stowable Seat", which is owned by the assignee of the present invention, for a further description of the track assembly.

The lower seat portion 10 comprises a transverse frame member 18 which is joined to and integrally formed with two frame side members 20 and 22. Frame side member 20 is joined to a forward parallelogram link which may be formed of nylon, as indicated at 24 in FIG. 1 and 7a. A pair of eyelets and a hinge pin 28 pivotally connect link 24 to the side frame 20. The lower end of the link 20 is connected pivotally by pivot pin 30 to an upright flange 32 of the base 14. A lower flange 34 of the base 14 could be bolted by anchor bolts or other suitable fastening devices to the floor of the vehicle, although in the particular embodiment shown in FIG. 1, the base 14 is secured in place by the track assembly 16.

A second link, which also may be formed of nylon, is shown at 36. The upper end of the link 36 is pinned at 38 to the frame side member 20 thereby providing a pivotal connection that is the equivalent of the connection between the link 24 and the side frame member 20. The lower end of the link 36 is connected pivotally to one end 40 of a cross bar 42, the latter extending transversely across the seat assembly to the opposite frame side member 22.

In the embodiment shown in FIG. 1, the cross bar 42 is joined to a roller 44 which operates in the track assembly 16. In the absence of the track assembly, however, the end 40 of the cross bar 42 would be secured to the base 14.

The seat back portion comprises an upper frame member 46 and two frame side members 48 and 50 which are secured together, as shown, to form an integral, continuous frame structure. The upper frame member 46 extends transversely across the seat assembly. It may be adapted to carry passenger head restraints 52 and 54.

The lower end of frame side member 48 is received in a semi-circular frame extension or bracket 56. Bracket 56, in turn, is pivotally connected to the end 40 of the cross bar 42 so that the seat back assembly can be tilted about the axis of the cross bar 42.

The bracket 56 carries a roller cam follower portion 58 which extends in the direction of the axis of the frame side member 48. The cam surface 58 is engaged by a roller assembly 60, which will be described with reference to FIG. 5.

The seat back frame 48 is supported by four parallelogram links 61 and 62 adjacent the side member 48 and by parallelogram linkages 64 and 66 adjacent the side member 50.

As seen in FIG. 2, parallelogram links 61 and 62 are secured by pin and eyelet connection 70 and 72, respectively, to back panel 68. They are pinned at the other ends thereof to the frame side member 48 by pin and eyelet connections 74 and 76, respectively. Corresponding connections are provided for the parallelogram linkage members 64 and 66 at the opposite side of the frame assembly, as seen in FIG. 1 at 78 and 80.

The back panel 68 has an auxiliary panel or extension 82 which is hinged at 84 to the upper margins of the panel. When the seat assembly is in its folded state, the auxiliary panel or extension 82 can be folded over the head rest 52 and the head rest 54 thereby providing a generally continuous platform surface.

The cam surface 58, as been seen in FIG. 2, engages roller 60. This roller is seen best in FIG. 4. It is carried on a roller supporting plunger or rod 86, which is received within the frame side member 20 of the frame 10 for the lower seat portion. Rod 86 extends in the direction of the axis of the frame side member 20. A spring seat element 88 is carried on the rod 86. A spring, shown in phantom at 90, acts on the rod 86 and the seat element 88 and tends normally to urge the roller 60 in a leftward direction, as seen in the perspective view of FIG. 4.

The roller 60 is recessed on its periphery as shown at 92. This recess allows the roller to straddle the cam surface at 58.

When the frame for the seat back portion is tilted forward about the axis of the rollers 44 to its folded position, the rollers 60 shift the frame 10 for the lower seat portion. This causes the parallelogram linkage elements at 36 and 24 to pivot about their respective pivot axes as the frame 10 shifts in a leftward direction from the position shown in FIG. 1. As it is shifted in a leftward direction in this fashion, the frame is lowered because of the parallelogram linkage mechanism until it assumes a position generally coplanar with respect to the base 32.

As the seat back frame is tilted forwardly, the rollers 60 ride along the cam surface 58 so that the force applied to the lower seat portion frame 10 is continuous.

The opposite side of the seat assembly illustrated in FIG. 1 is provided with a parallelogram linkage mechanism including linkage elements 94 and 96.

A restrictor plate is shown in FIG. 1 at 98 at one side of the seat assembly and a corresponding restrictor plate 100 is located at the opposite side of the seat assembly. Restrictor plate 98 and restrictor plate 100 are pivoted on the cross-rod 42. Thus, both restrictor plates and both parallelogram linkage elements 36 and 96 pivot about a common axis. The upper end of the elements 36 and 96 are pivotally connected to the lower seat portion side-frame members 20 and 22, respectively. As indicated previously, the restrictor plates 98 and 100 also are pinned to the frame side-members 20 and 22. The pivot pin at the upper ends of the linkage elements 36 and 96 and the pin for the restrictor plates 98 and 100 are common.

The frame side member 50 for the upright seat back portion has a semicircular frame extension 102 that corresponds to the frame extension 56. As seen in FIG. 8, the extension 102 has a pair of openings through which a locking pin 104 is received. The pin 104 extends through an arcuate slot 106 formed in the restrictor plate 100.

A locking pin spring 108 surrounds the pin 104 and is disposed within the semicircular frame extension 102. Pin 104 is provided with a spring seat element 110 for biasing normally the pin 104 toward the base 32'.

As in the case of frame extension 56, the frame extension 102 has a cam surface shown at 112 which corresponds to the cam surface 58. This engages a roller that corresponds to the roller 60 described previously with reference to FIG. 4. That roller is carried by a rod that is received by lower seat portion frame side-member 22.

When the pin 104 is moved against the force of the spring 108, it disengages from the base 32'. This unlocks the frame for the seat back portion thereby permitting it to be folded forward. When the locking pin 104 is in the position shown in FIG. 8, the seat back portion is relatively fixed with respect to lower seat portion frame 10.

A corresponding pin is received through an arcuate slot in the restrictor plate 983, through the frame extension 56 and through the base 32.

The pin 104 and the corresponding pin for the restrictor plate 98 can be pulled against the opposing force of the springs for the locking pins by cables 114 and 116, respectively. The cables are joined to an actuating lever 118, as seen in FIG. 1. The lever 118 can be rotated in a counterclockwise direction to unlock the pins from their respective pin openings in the bases 32' and 32. When the actuating lever 118 is moved in a clockwise direction, the locking pin will snap into the locking position for the upright seat back portion under the influence of the springs for the locking pins.

Figure 6:
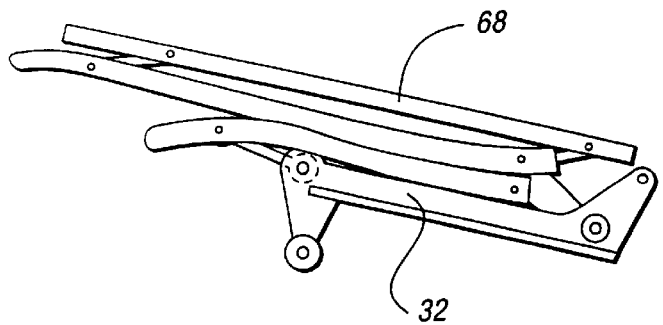
FIG. 6 is a schematic representation of a folded seat assembly.

When the locking pins are released, the seat back portion can be folded forward. This causes the lower seat portion to be shifted forward as indicated in FIG. 6. Because of the parallelogram linkage established by the linkage elements 24 and 36 and by the parallelogram linkage elements 94 and 96, the lower seat portion will be folded downward as it shifted forward.

The parallelogram linkage established by the linkage elements 62 and 60 on one side of the seat back portion and by the linkage elements 66 and 64 on the opposite side of the seat back portion are held in their extended position shown in FIG. 2 by a link 120. One end of the link 120 is pinned rotatably at 122 to the base 32. At its opposite end it is pinned at 72 to the end of link 62 at the lower region of the seat back portion.

The panel 68 together with the side member 48 of the frame 12 for the seat back portion form opposite sides of a parallelogram linkage as seen in FIG. 2. As the frame 12 is pivoted about the axis of the rod end 40, the link 120 causes the parallelogram linkage elements 60 and 62 to pivot thereby folding the parallelogram linkage until it achieves the folded state indicated in FIG. 6.

The link 120 can be formed as shown in FIG. 1 so that interference with the frame side-member 48 will not occur when the seat back portion 12 is folded forwardly.

Figure 6A:
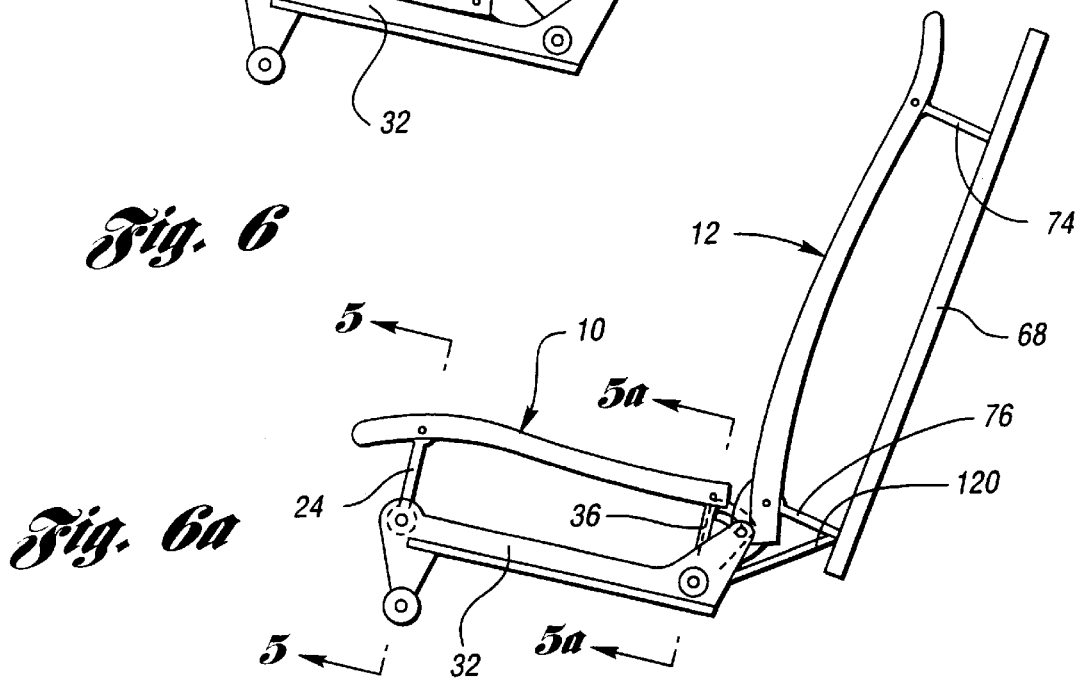
FIG. 6a is a schematic representation of the seat assembly of FIG. 7 in its upright: state.

The construction shown in FIGS. 6 and 6a is illustrated only schematically. The mounting structure for the base 32, for example, differs from the mounting structure illustrated in FIG. 1. FIGS. 6 and 6a are intended merely to show the mode of operation of the foldable parallelogram linkages.

Figure 5:
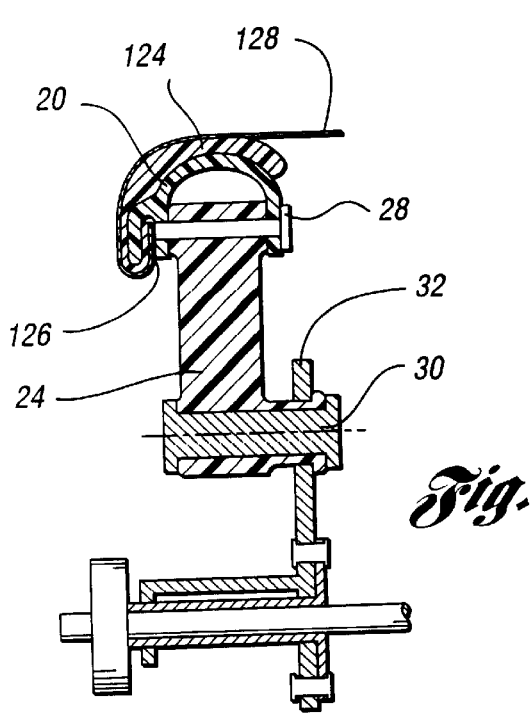
FIGS. 5 and 5a are detail sectional views taken along section lines 5—5 and 5a—5a, respectively, in FIG. 6 showing a nylon link that is used in the parallelogram linkage for the lower seat assembly.
Figure 5A:
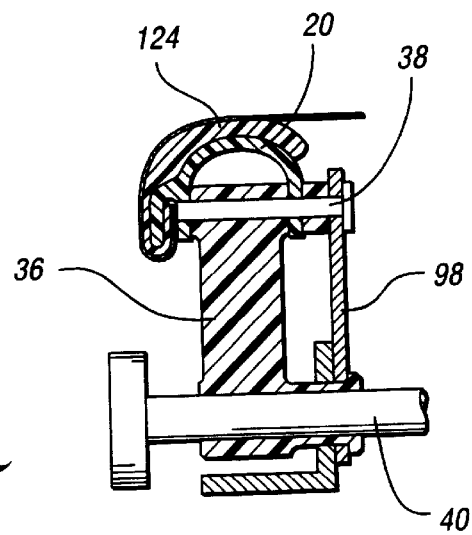

FIGS. 5 and 5a show cross-sectional representations of the frame member 20 for the lower seat portion. The link 24 of FIG. 5 is shown also in FIG. 7a. Frame member 20 has a foam rubber cushion 124, and a corresponding cushion is provided on the frame side-member 22 of the lower seat portion. The outer margin of the frame member 20 is provided with a channel 126 in which is received the margin of the foam rubber cushion 124, thereby holding the latter securely in place.

An elastomer fabric 128 is stretched across the lower seat portion and is anchored in the frame side members 20 and 22 in the manner illustrated schematically in FIGS. 5 and 5a. The elastomer fabric is a woven fabric which yields under the weight of the passenger. A material that has been successfully used for this purpose is manufactured by Acme Mills Company of Detroit, Mich. under the tradename "DYMATROL". The use of the elastomer fabric and the use of hollow frame members, which preferably are made of aluminum alloy, results in a very light weight seat assembly which reduces the weight of the vehicle. The reduced weight also makes it easier to assemble the seat assemblies and to carry the seat assemblies when they are removed from the vehicle.

When the seat back portion is folded forward as described previously, the springs that act on the rollers 60 at each side of the seat assembly cause the locking pin 104 to engage one end of the arcuate slot 106 and the corresponding slot for the restrictor plate 98. When the seat back portion has been moved through an arc of about 85° as it is folded forward to the position shown in FIG. 6, the end of the arcuate slots are engaged by their respective unlocking pins. Further movement in the forward folding direction can be achieved through an angle of about 15° as the pin 104 and the corresponding pin for the restrictor plate 98 move in the respective arcuate slots in the restrictor plates 100 and 98. This additional arcuate travel of the seat back portion is needed because the length of the arc traveled by the upper end of the link 120 exceeds the length of the arc traveled by the upper end of the parallelogram linkage element 36.

Figure 3:
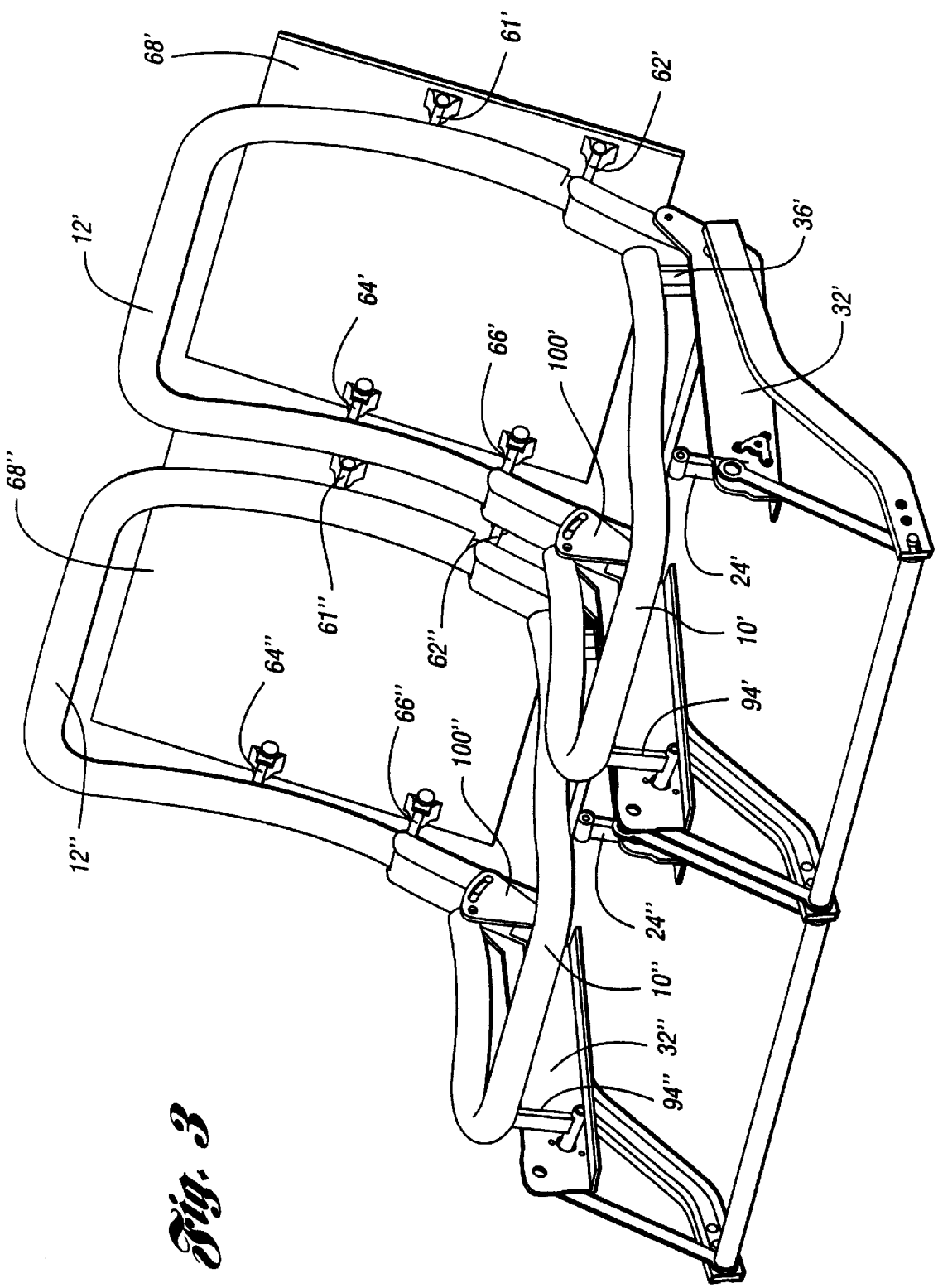
FIG. 3 is an alternate embodiment of the invention which comprises a tandem seat arrangement, each seat of the tandem arrangement embodying the features of-the invention illustrated in FIG. 1.

FIG. 3 shows a tandem arrangement for the foldable seat assembly of the invention. The embodiment of FIG. 3 functions in the same fashion as the embodiment of FIG. 1 and the description of the mode of operation need not be repeated for purposes of clarity, the reference numerals have been indicated in the embodiment of FIG. 3 with prime notations in the case of left-hand seat assembly and double prime notations in the case of right-hand seat assembly. These numerals with prime notations or double prime notations correspond to the numerals designating similar structure in the embodiment of FIG. 1.

Although a particular embodiment of the invention has been disclosed, it is contemplated that variations in the design may be made by persons skilled in the art without departing from the teachings of the invention. It is intended that the following claims will cover such modifications to the design and design equivalence thereof.

What we claim and desire to secure by U.S. Letters Patent is:

1. A seat assembly with a lower seat portion and an upright seat back portion, the lower seat portion being supported on a base, said seat back portion being pivoted on said base;

a first foldable linkage mechanism supporting said lower seat portion on said base;

said upright seat back portion being engageable with said lower seat portion upon pivotal movement of said upright seat back portion to a stacked position over said lower seat portion, said foldable linkage mechanism comprising movable linkage elements pivoted at one end on said base and at the other end on said lower seat portion whereby said lower seat portion is moved forward relative to said base;

said foldable linkage mechanism being movable upon forward movement of said lower seat portion thereby lowering said lower seat portion toward said base and reducing the overall stacked height of the seat assembly when it is in a folded state;

said upright seat back portion including a back panel, a second foldable linkage mechanism connecting said upright seat back portion to said panel; and an actuator link connected at one end thereof to said base and at the other end thereof to said second foldable linkage mechanism whereby pivotal forward movement of said upright seat back portion moves said second foldable linkage mechanism to a folded position.

2. A seat assembly with a foldable lower seat portion and an upright foldable seat back portion supported on a base, said seat back portion being connected pivotally at its lower margin on said base near a rearward margin of said lower seat portion;

at least one first linkage element connected at its upper end to a forward margin of said lower seat portion and at least one second linkage element connected at its upper end to said rearward margin of said lower seat portion, the lower ends of said first and second linkage elements being pivotally connected to said base;

said first and second linkage elements defining forward and rearward sides of a foldable parallelogram linkage mechanism;

said seat back portion being engageable with said lower seat portion as it is pivoted forward over said lower seat portion, said linkage mechanism folding to a lowered position upon pivotal movement of said seat back portion thereby reducing the overall stacked height of the seat assembly when it is in a folded state;

said upright seat back portion including a back panel, a second foldable linkage mechanism connecting said upright seat back portion to said panel; and an actuator link connected at one end thereof to said base and at the other end thereof to said second foldable linkage mechanism whereby pivotal forward movement of said upright seat back portion moves said second foldable linkage mechanism to a folded position.

3. The seat assembly as set forth in claim 2 wherein said lower seat portion comprises an lower seat frame with forward and rearward margins and said upright seat back portion comprise an upright seat frame, said upright seat frame being pivoted on said base adjacent the rearward margin of said lower frame;

said upright seat back portion including a back panel, a second foldable linkage mechanism connecting said upright seat back portion to said panel; and an actuator link connected at one end thereof to said base and at the other end thereof to said second foldable linkage mechanism whereby pivotal forward movement of said upright seat back portion moves said second foldable linkage mechanism to a folded position.

4. A seat assembly with a lower seat portion and an upright seat back portion, the lower seat portion being supported on a base, said seat back portion being pivoted on said base; and a foldable linkage mechanism supporting said lower seat portion on said base;

said upright seat back portion being engageable with said lower seat portion upon pivotal movement of said upright seat back portion to a stacked position over said lower seat portion, said foldable linkage mechanism comprising first and second movable linkage elements pivoted at one end on said base and at the other end on said lower seat portion whereby said lower seat portion is movable forward relative to said base;

said foldable linkage mechanism being movable upon forward movement of said lower seat portion thereby lowering said lower seat portion toward said base and reducing the overall stacked height of the seat assembly when it is in a folded state;

said lower seat portion comprising a lower seat frame with forward and rearward margins and said upright seat back portion comprising an upright seat frame, said upright seat frame being pivoted on said base adjacent the rearward margin of said lower seat frame;

said lower seat frame comprising a yieldable roller assembly connected to said lower seat frame at said rearward lower seat frame margin, said roller assembly engaging a lower portion of said upright seat frame;

said upright seat frame, upon pivotal movement thereof toward a forward folded position, displacing said yieldable roller assembly in a direction toward said forward margin of said lower seat frame.

5. The seat assembly as set forth in claim 4 including a restrictor plate pivoted at a first pivot point on said base and pivoted at a second pivot point to said lower seat frame at the location of said other end of said second linkage element; and a releasable lock element connecting said upright seat frame to said base and to said restrictor plate whereby pivotal motion of said upright seat frame and folding motion of said first and second linkage elements are controlled.

6. The seat assembly as set forth in claim 5 wherein said upright seat back portion includes a back panel, a second foldable linkage mechanism connecting said upright seat back portion to said panel; and an actuator link connected at one end thereof to said base and at the other end thereof to said second foldable linkage mechanism whereby pivotal forward movement of said upright seat back portion moves said second foldable linkage mechanism to a folded position.

7. The seat assembly as set forth in claim 5 wherein said restrictor plate includes an arcuate slot, said releasable lock element extending through said slot whereby secondary pivotal, forward movement of said upright seat back portion relative to said base is accommodated following initial pivotal movement thereof to a predetermined angular position relative to said base.

8. The seat assembly as set forth in claim 7 wherein said upright seat back portion includes a back panel, a second foldable linkage mechanism connecting said upright seat back portion to said panel; and an actuator link connected at one end thereof to said base and at the other end thereof to said second foldable linkage mechanism whereby pivotal forward movement of said upright seat back portion moves said second foldable linkage mechanism to a folded position.

9. The seat assembly as set forth in claim 4 wherein said upright seat back portion includes a back panel, a second foldable linkage mechanism connecting said upright seat back portion to said panel; and an actuator link connected at one end thereof to said base and at the other end thereof to said second foldable linkage mechanism whereby pivotal forward movement of said upright seat back portion moves said second foldable linkage mechanism to a folded position.

\* \* \* \* \*